(No Model.) 7 Sheets—Sheet 1.
H. JERSTRUM.
CIGAR BUNCHING MACHINE.
No. 588,912. Patented Aug. 24, 1897.
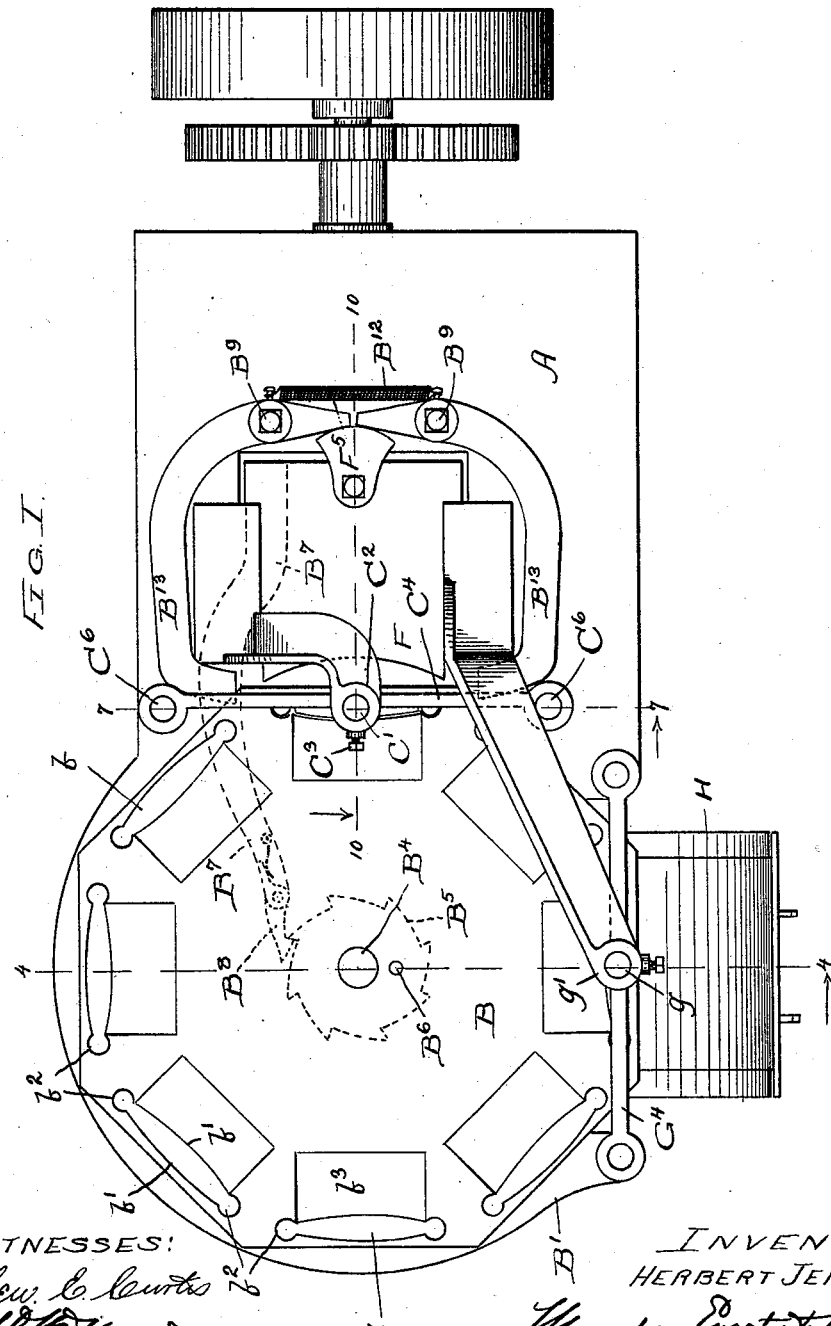
WITNESSES:
INVENTOR:
HERBERT JERSTRUM
BY Munday, Evarts & Adcock,
HIS ATTORNEYS.

(No Model.)  7 Sheets—Sheet 2.
H. JERSTRUM.
CIGAR BUNCHING MACHINE.
No. 588,912.  Patented Aug. 24, 1897.
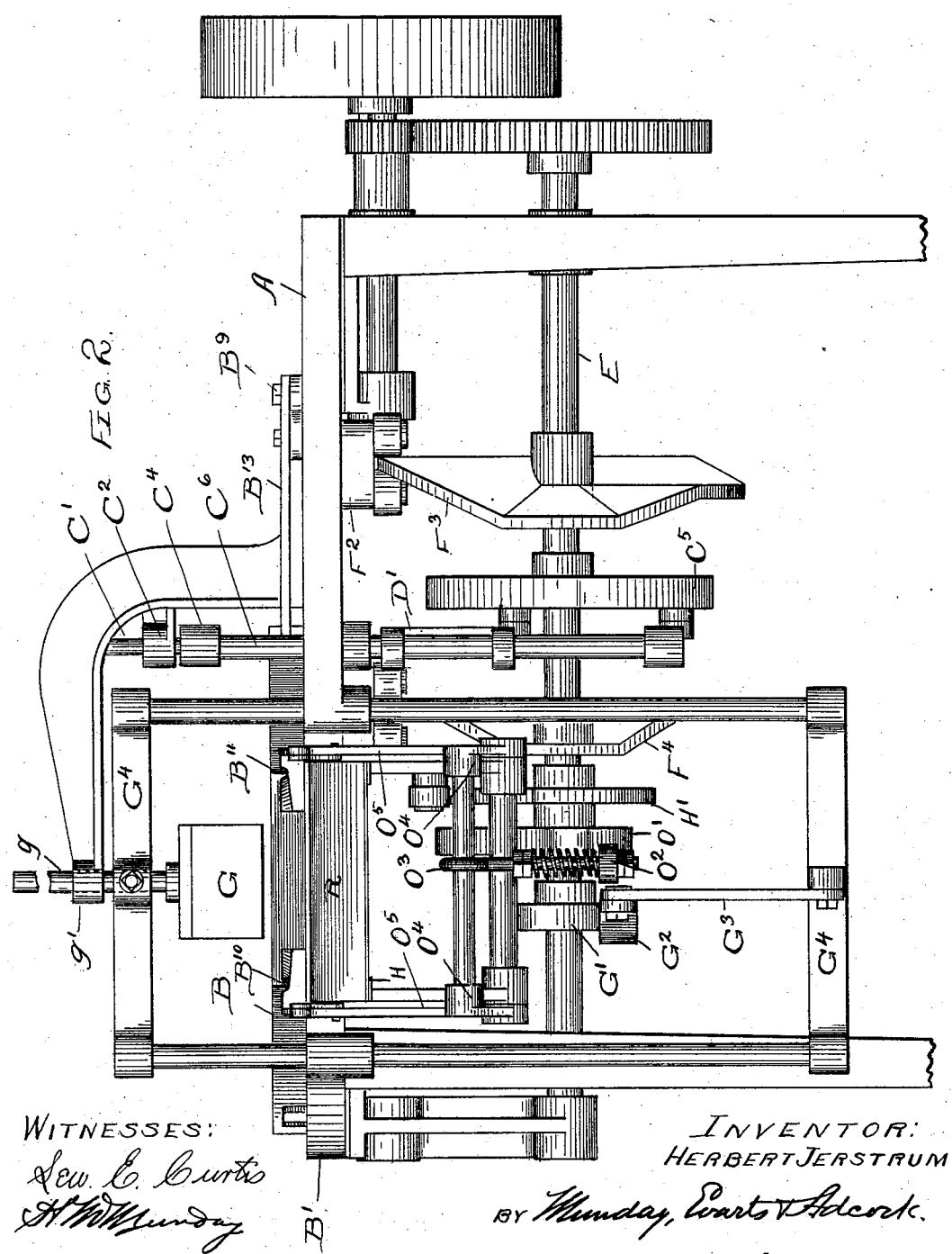
WITNESSES:
Lew. E. Curtis
H. W. Munday
INVENTOR:
HERBERT JERSTRUM
BY Munday, Evarts & Adcock.
HIS ATTORNEYS.
THE NORRIS PETERS CO., PHOTO-LITHO., WASHINGTON, D. C.

(No Model.)　　　　　　　　　　　　　　　　　　　　7 Sheets—Sheet 3.
H. JERSTRUM.
CIGAR BUNCHING MACHINE.
No. 588,912.　　　　　　　　　　　　　Patented Aug. 24, 1897.
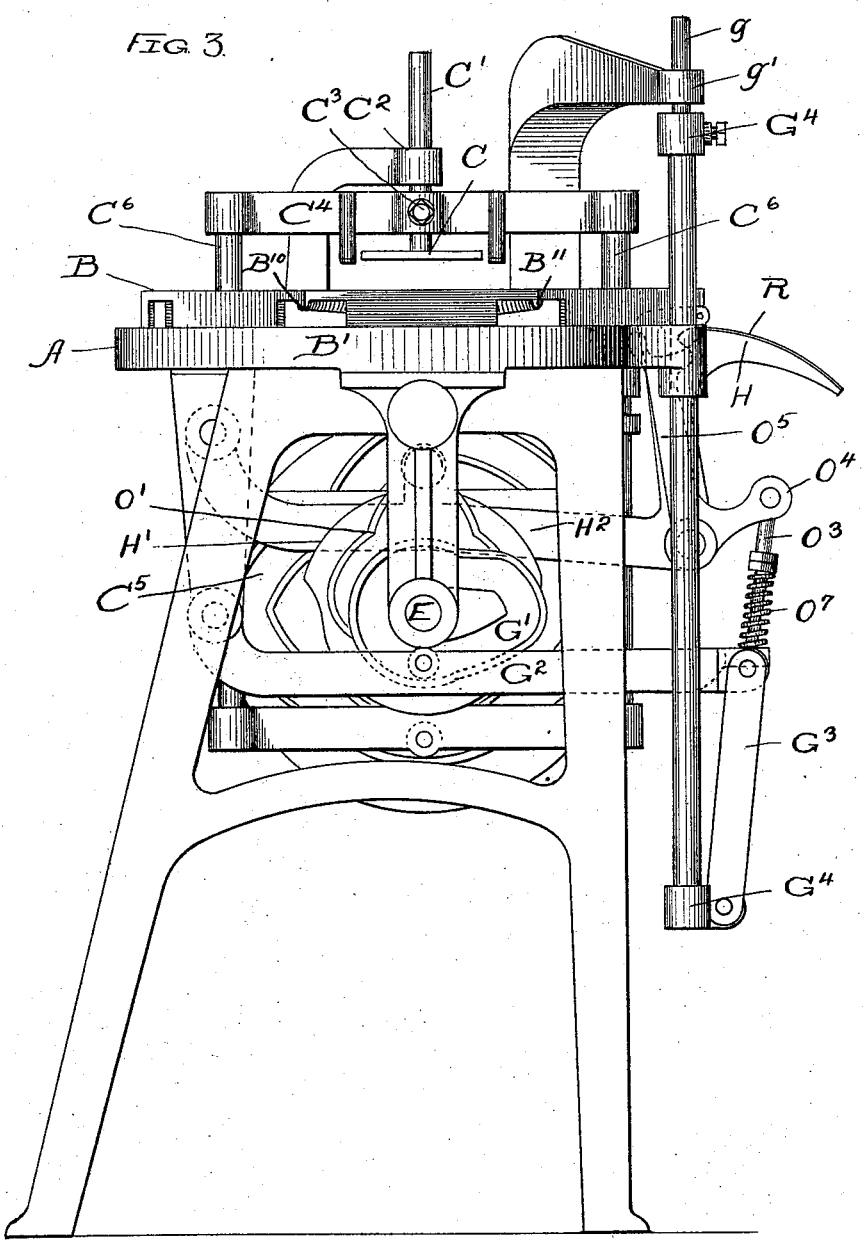
WITNESSES:
Sew. E. Curtis
INVENTOR:
HERBERT JERSTRUM
By Munday, Evarts & Adcock
HIS ATTORNEYS.
THE NORRIS PETERS CO., PHOTO-LITHO., WASHINGTON, D. C.

(No Model.)
7 Sheets—Sheet 4.
H. JERSTRUM.
CIGAR BUNCHING MACHINE.
No. 588,912. Patented Aug. 24, 1897.
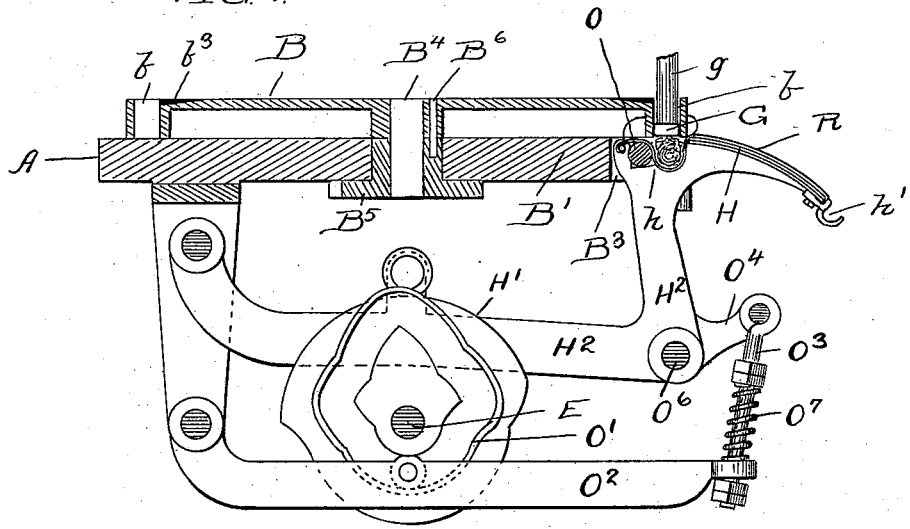
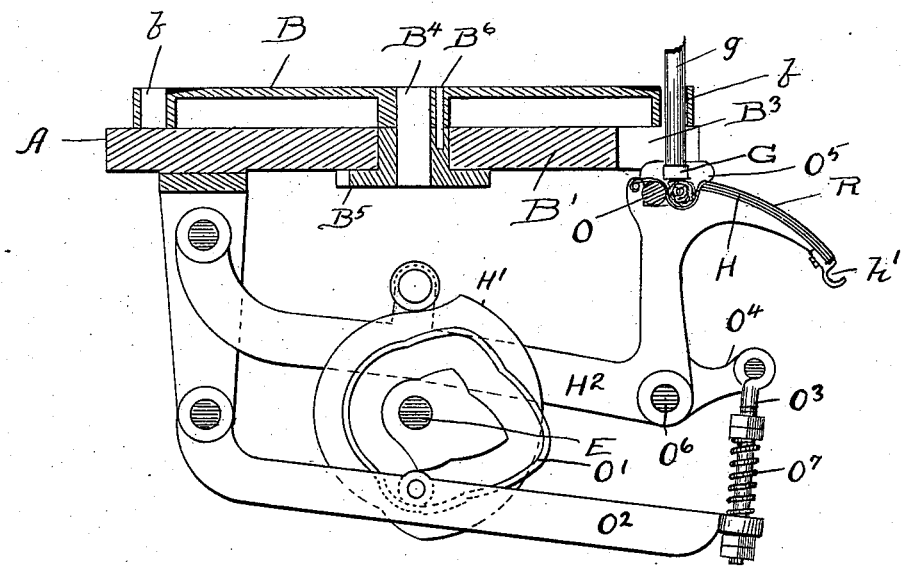
WITNESSES:
INVENTOR:
HERBERT JERSTRUM
BY
HIS ATTORNEYS.

(No Model.) 7 Sheets—Sheet 5.
H. JERSTRUM.
CIGAR BUNCHING MACHINE.
No. 588,912. Patented Aug. 24, 1897.
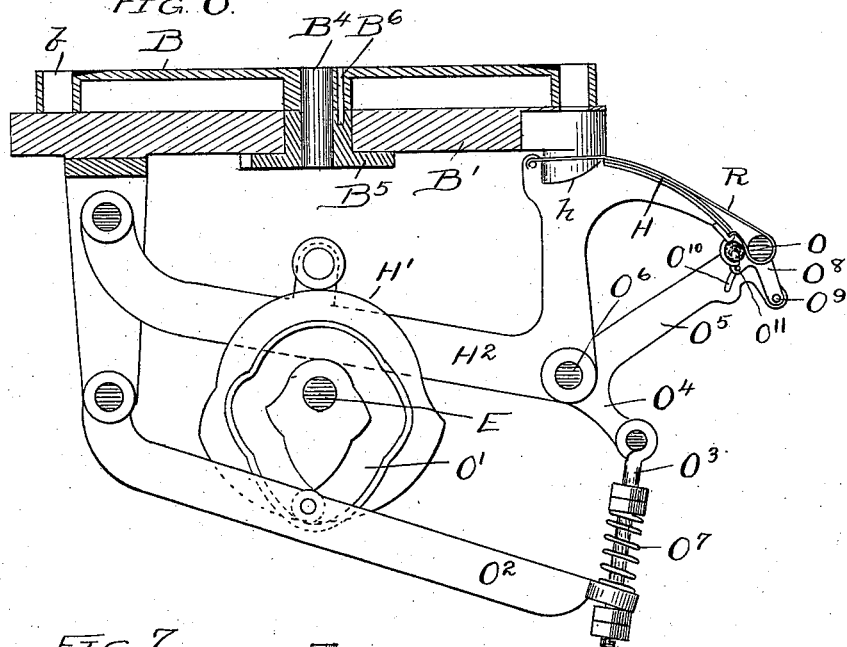
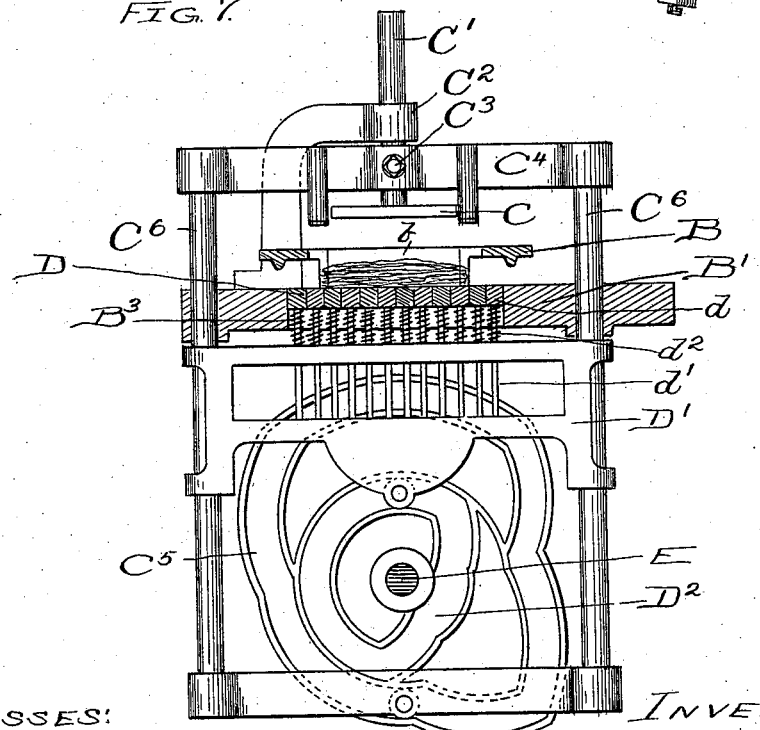
WITNESSES:
Sew. E. Curtis
H. W. Munday
INVENTOR:
HERBERT JERSTRUM
BY Munday, Evarts & Adcock
HIS ATTORNEYS

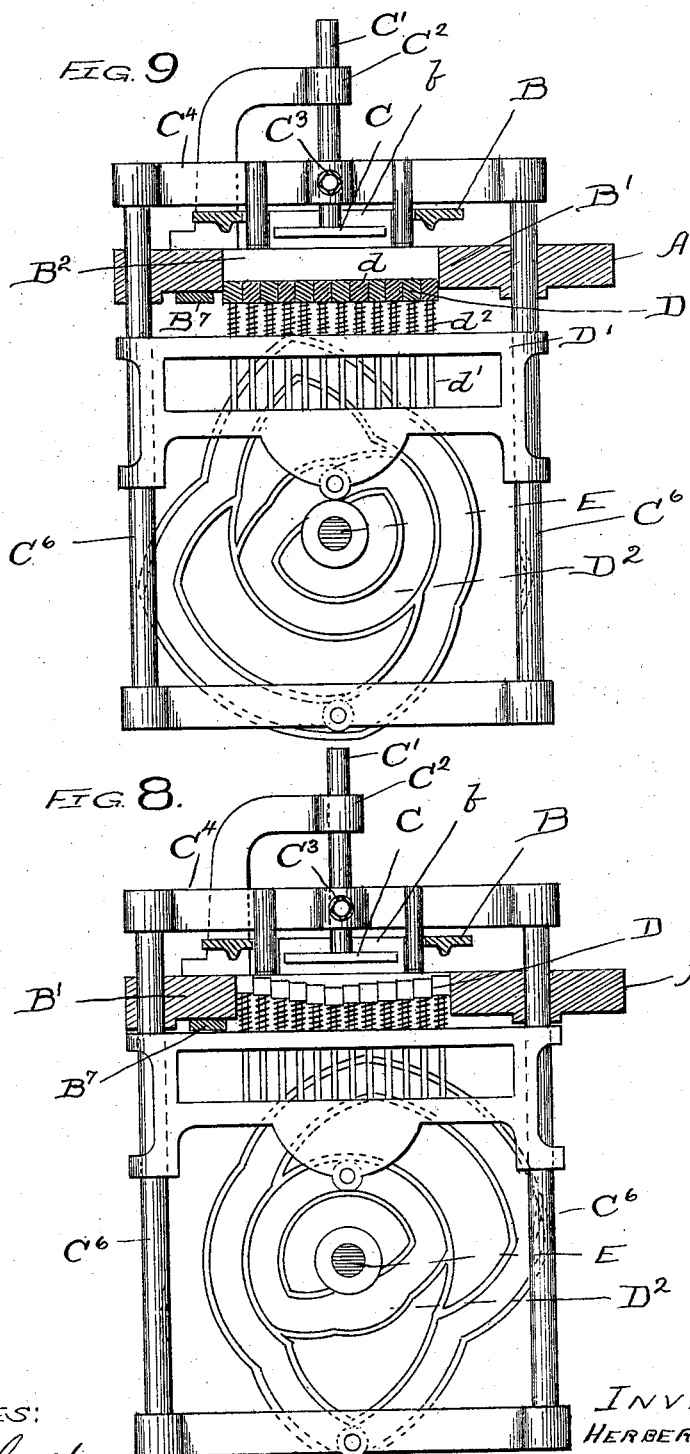

(No Model.) 7 Sheets—Sheet 7.
H. JERSTRUM.
CIGAR BUNCHING MACHINE.
No. 588,912. Patented Aug. 24, 1897.
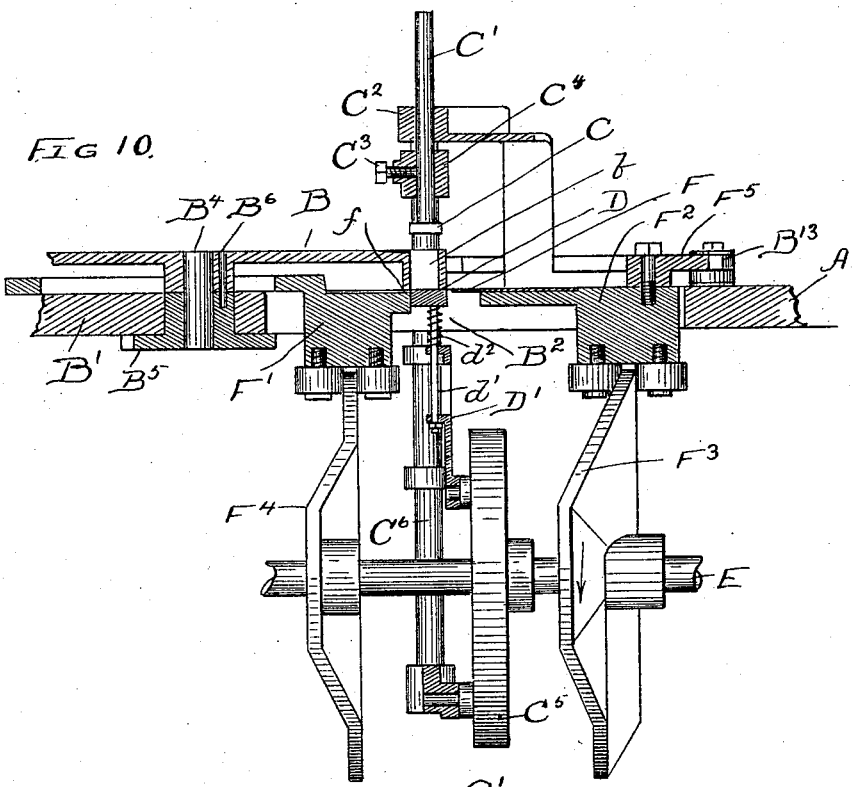
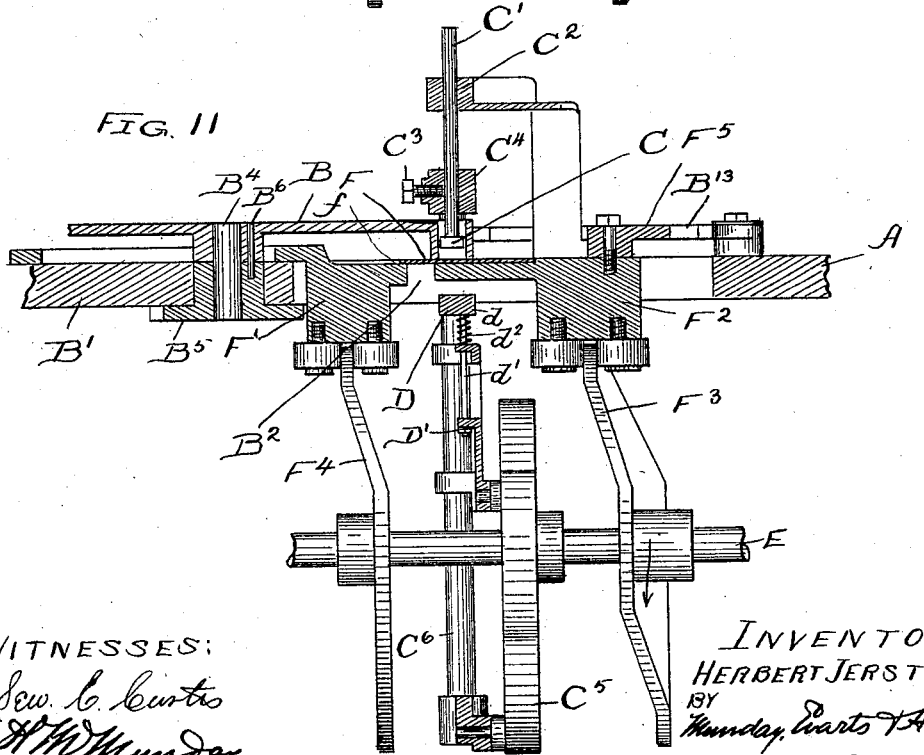
WITNESSES:
INVENTOR:
HERBERT JERSTRUM
BY
HIS ATTORNEYS.

UNITED STATES PATENT OFFICE.

HERBERT JERSTRUM, OF CHICAGO, ILLINOIS, ASSIGNOR TO HERBERT A. STREETER, OF SAME PLACE.

CIGAR-BUNCHING MACHINE.

SPECIFICATION forming part of Letters Patent No. 588,912, dated August 24, 1897.

Application filed December 19, 1896. Serial No. 616,288. (No model.)

*To all whom it may concern:*

Be it known that I, HERBERT JERSTRUM, a citizen of the United States, residing in Chicago, in the county of Cook and State of Illinois, have invented a new and useful Improvement in Cigar-Bunching Machines, of which the following is a specification.

My invention relates to improvements in cigar-bunching machines, and more particularly to certain improvements upon the invention heretofore patented to me in Letters Patent of the United States No. 528,166, dated October 30, 1894.

The object of my present improvement is to simplify the construction and operation of the machine of my said Patent No. 528,166 and to increase its efficiency and durability.

In my improved machine, as will be readily understood from the accompanying drawings, forming a part of this specification, each of the series of revolving feed-hopper chargers is made of a special novel construction and coöperates in turn directly with the compression-plunger and with the movable sectional bottom, which opposes the thrust of the compression-plunger, and also with the knife by which the surplus is severed from the filler-charge, and also in turn with the discharging-plunger, by which the filler-charge is forced from the feed hopper or charger into the sag or pocket of the apron. By this and other improvements illustrated in the drawings, and hereinafter more particularly specified in the claims, the construction of the machine is materially simplified and the machine made more durable and efficient in operation.

My present invention consists in the novel construction of parts and devices and in the novel combinations of parts and devices hereshown and described, and particularly specified in the claims.

In said drawings, Figure 1 is a plan view of my improved machine; Fig. 2, a side elevation; Fig. 3, an end view; Fig. 4, a detail section on the line 4 4 of Fig. 1. Figs. 5 and 6 are sectional views similar to Fig. 4, showing the parts in different positions. Fig. 7 is a section on the line 7 7 of Fig. 1. Figs. 8 and 9 are sectional views similar to Fig. 7, showing the parts in different positions. Fig. 10 is a section on the line 10 10 of Fig. 1; and Fig. 11 is a sectional view similar to Fig. 10, but showing the parts in a different position.

In the drawings, A represents the frame of the machine. B is a horizontal intermittently-rotating plate or wheel furnished near its periphery or outer edge with a series of bottomless chargers $b$, into which the filler or tobacco is placed. The rotating charger plate or wheel B fits above a stationary plate B', secured to the frame of the machine and which constitutes the bottom for the several chargers $b$, except at the position where the filler-charge is being compressed by the compression-plunger and at the position where the filler-charge is being removed or discharged from the charger by the discharging-plunger, at which points or positions the bottom plate B' is cut away or furnished with notches $B^2 B^3$, so that the movable sectional bottom D and the apron R and bunching-roller O and table H may properly coöperate with the series of rotary chargers $b$ and the compression and discharging plungers.

Each of the chargers $b$ in the rotary charger plate or wheel B is furnished with oppositely-curved vertical walls $b' b'$, united by circular enlargements $b^2 b^2$ at each end, and the upper surface of the charger-plate B is furnished with an inclined or dished part $b^3$, leading to the charger $b$, as is clearly shown in the drawings at Figs. 1, 4, 5, 6, 10, and 11. The purpose of this particular construction of the charger is to facilitate the feeding of the tobacco filler into the charger and at the same time to give the requisite bellied form to the filler-charge, larger at the middle and tapering toward each end. The round or circular enlargements $b^2 b^2$ at each end of the charger should be large enough to admit the little fingers of the operator in crowding the tobacco into the charger at the ends thereof, while the other or middle fingers of the operator are used for crowding the tobacco into the charger at the middle or bellied portion thereof. The dished or inclined part $b^3$ of the charger-plate leading to the charger facilitates the pushing or scraping of the tobacco from the plate B, which serves in a measure as a feed-table, into the charger. The rotary charger plate or wheel B is secured or keyed to a short shaft $B^4$, to which also is secured a ratchet B⁵ for intermittently revolving the charger-plate, the charger-plate and ratchet being secured together by a pin or key B⁶ and the whole revolving on the bottom or frame plate B'.

C is the vertically-reciprocating compressing-plunger by which the tobacco in each of the chargers $b$ is successively compressed against the movable or sectional bottom D, with which each charger is successively brought into position for coöperation by the intermittently-rotary movement of the charger-plate B.

The compressing-plunger C has a stem C', which reciprocates in a suitable guide $C^2$, fixed to the frame of the machine, and which is adjustably secured by a set-screw $C^3$ to a reciprocating cross-head $C^4$, so that the stroke and degree of compression produced by the plunger C upon the tobacco may be properly adjusted and regulated. The compressing-plunger operating cross-head $C^4$ is reciprocated by a cam $C^5$ on the cam-shaft E.

Each of the separate and independently-movable sections $d$ of the movable sectional bottom D is furnished with a stem $d'$, mounted to reciprocate in suitable guide-holes in a movable cross-head or slide D' and with springs $d^2$, which yieldingly support each of the sections $d$ in position, so that the sections $d$ may yield independently of each other against the compression of the compressing-plunger C at points where there may be an excess of tobacco. By this means the undue compression or solidifying of the tobacco throughout any portion of the length of the bunch is prevented. The cross-head or slide D', upon which the movable sectional bottom D is mounted, is reciprocated up and down by means of a cam $D^2$ on the cam-shaft E to bring the movable sectional bottom D into position for coöperation with the compressing-plunger C and to withdraw the same out of the way of the horizontally-reciprocating knife F at intervals. The cross-head or slide D' reciprocates on and is guided by the vertical rods $C^6$ $C^6$ of the cross-head $C^4$.

The compressing-plunger C is caused by its operating-cam $C^5$ to give a double stroke upon each filler-charge, so as to produce a better and more uniform compression of each successive charge of tobacco. The purpose of combining a double-stroke or two-stroke compression-plunger with the charger and movable sectional bottom is to enable any pieces of tobacco that may catch and bind between the edges of the compressing-plunger and the walls of the charger and thus interfere with the proper compression at the first stroke to fall in out of the way when the plunger is withdrawn after the first stroke, so that at its second and final stroke nothing may interfere with the proper compression of the charge. The first stroke of the plunger C only partially compresses the charge, serving to push the tobacco well into the charger, while the second or final stroke of the compressing-plunger is relied upon to produce the proper and uniform compression of the tobacco.

The knife F, by which the surplus tobacco in the charger is severed from the filler-charge while the tobacco in the charger is compressed and held compressed between the plunger C and the movable sectional yielding bottom D, is mounted to reciprocate just beneath the charger $b$ and between said charger and the movable sectional bottom D, as is clearly indicated at Figs. 10 and 11. To enable the knife F to better do its work and to keep it cleaned from becoming gummed or sticky, I combine with it a movable opposing cutting-block F', having an edge or corner $f$, over which the knife F may fit or slide, as indicated in Figs. 11 and 10, and by which any gummy substance from the tobacco which may tend to collect on the knife is cleaned or scraped off. The lower face or edge of the charger $b$ also in a measure tends to keep the knife clean or free from gumming. At the time the knife severs the surplus tobacco from the charge such surplus is of course in the space formed by the depression of the sections $d$ of the bottom D below the plane of the knife, as indicated in Fig. 9.

The knife F is secured to a reciprocating slide or block $F^2$, which slides back and forth in suitable guideways in the frame-plate B', and it is thus reciprocated by a cam $F^3$ on the cam-shaft E. The cutting-block F' is given its required reciprocating movement by a cam $F^4$ on the cam-shaft E.

The rotary charger-plate B is given its intermittent rotary movement by means of an arm $B^7$, attached to the knife-slide $F^2$, and which is furnished with a pawl $B^8$, that engages the ratchet $B^5$ on the shaft of the charger-plate wheel B. The rotary charger plate or wheel B is intermittently locked or held accurately in registry with the compressing-plunger and other parts by means of locking-levers $B^{13}$ $B^{13}$, pivoted to the frame at $B^9$, and the inner ends of which are engaged by a projection $F^5$, secured to the knife-slide $F^2$, and the outer ends of which locking-lever engage ribs or projections $B^{10}$ $B^{11}$ on the rotary wheel B. The locking arms or levers $B^{13}$ $B^{13}$ are retracted or open when the knife-slide withdraws by a spring $B^{12}$, connecting the two, thus permitting the rotary plate or wheel B to again turn one step.

G is the discharging-plunger, which serves to push the charge of filler from the charger $b$ into the sag or pocket of the apron R, as illustrated in Figs. 4 and 5. This discharging-plunger G or its stem $g$ is mounted to reciprocate in suitable guides $g'$ on the frame of the machine and is operated by a cam G' on the cam-shaft E through a suitable connecting-lever $G^2$ and link $G^3$ and cross-head $G^4$.

H is the rolling-table, the same being cut away at $h$ to form a cavity in which the sag or slack of the apron R fits at the time the charge is forced out of the charger $b$ by the discharging-plunger G and into the sag or slack of the apron preparatory to being operated upon by the bunching-roller O. The table H is made, or preferably made, of a curved shape, about as indicated in the drawings, and it is mounted movably, so that it may be moved up and down, it being first moved up to near the lower face of the charger $b$ to receive the filler-charge therefrom, as indicated in Fig. 4, and then into a lower position, as indicated in Fig. 5, to permit the bunching-roller O, which, in connection with the apron R, wraps the binder around the filler-charge, to pass between the charger $b$ and the table H. This will be readily understood from Figs. 4, 5, and 6. During the time the filler-charge is being pushed into the sag or slack of the apron and while the bunching-roller O is beginning to move around the filler-charge to inclose the same in the bight of the apron the discharging-plunger G is kept depressed against the tobacco, as illustrated in Fig. 5, the discharging-plunger G being simply moved out of the way of the roller O as said roller advances.

The movable table H is given its required up-and-down movements, to enable it and the apron carried by it to thus directly coöperate with each of the series of movable chargers $b$ in turn and bunching-roller O, by means of a cam H' on the cam-shaft E and a suitable connecting-lever $H^2$, to which the curved table H is secured, or with which it is cast integral, as illustrated in the drawings.

The bunching-roller is swung or moved over the surface of the curved table H, as required to cause the apron R to roll the binder about the filler-charge, by means of a cam O' on the cam-shaft E and a suitable connecting-lever $O^2$ and link $O^3$, which is pivoted to the arm $O^4$ of the lever $O^5$, upon which the bunching-roller O is mounted. The lever $O^5$ is pivoted at $O^6$ to the table arm or lever $H^2$, so that the path of the roller O will be concentric with the curved table H. A spring $O^7$ on the link $O^3$ serves as a compensating device in the backward movement of the roller O and its lever $O^5$, thus enabling the roller O or its lever $O^5$ to be brought back into position against a fixed stop without danger of breaking or straining the parts.

The curved table H is furnished with a receptacle or cavity $h'$ at its outer end to receive the finished bunch and from which the operator can conveniently take the bunch and place it in the mold.

The bunching-roller O is mounted or journaled upon a pair of swinging arms $O^8$, pivoted at $O^9$ to the lever $O^5$ to permit of sufficient upward movement of the bunching-roller to enable it to pass over the bunch and onto the table H. A guide-slot $O^{10}$ in the lever $O^5$, in which a pin $O^{11}$ on the arm $O^9$ fits, limits the upward movement of the bunching-roller.

I claim—

1. In a cigar-bunching machine, the combination with a horizontally intermittently-rotating charger plate or wheel furnished with a series of bottomless chargers, a stationary bottom plate upon which said charger plate or wheel rotates, and provided with notches at the compressing and discharging stations, a compressing-plunger, a movable sectional bottom for the chargers coöperating with the compressing-plunger, a movable knife and opposing knife-block, a discharging-plunger, an up-and-down movable bunch-rolling table, an apron, and a bunching-roller and means for moving the bunch-rolling table up and down, all combined and coöperating substantially as specified.

2. In a cigar-bunch machine, the combination with an intermittently-rotating charger-plate furnished with a series of chargers open at top and bottom, with a compressing-plunger coöperating in turn with each of the chargers, a movable bottom coöperating with the compressing-plunger and against which the tobacco is compressed, a knife for severing the surplus tobacco from the charge, a discharging-plunger, and a table, apron and bunching-roller for receiving the charge and wrapping the binder around the same when delivered from each successive charger by the discharging-plunger, substantially as specified.

3. In a bunching-machine, the combination with intermittently-rotary charge-plate B furnished with a series of chargers $b$ having oppositely-curved walls $b'$ $b'$, provided with enlargements $b^2$ at each end of the charger, and having inclined or dished part $b^3$, with a bottom plate B', substantially as specified.

4. In a cigar-bunch machine, the combination with a charger-plate having a charger furnished with opposing outwardly-curved walls $b'$ and enlarged circular ends $b^2$, substantially as specified.

5. In a cigar-bunch machine, the combination with a charger-plate having a charger furnished with opposing outwardly-curved walls $b'$ and enlarged circular ends $b^2$, and said plate having an inclined or dished part $b^3$ leading to the charger, substantially as specified.

6. In a cigar-bunch machine, the combination with a bottom plate and an intermittently-rotating charger-plate furnished with a series of chargers, of a compressing-plunger, a movable bottom for the chargers below said charger-plate, and a knife reciprocating between said chargers and said movable bottom, and means for reciprocating said knife, substantially as specified.

7. In a cigar-bunch machine, the combination with a bottom plate and an intermittently-rotating charger-plate furnished with a series of chargers, of a compressing-plunger above said charger-plate, a movable bottom for the chargers below said charger-plate, and a knife reciprocating between said chargers and said movable bottom, said bottom being composed of independently-yielding movable sections, and means for reciprocating said knife substantially as specified.

8. In a cigar-bunch machine, the combination with an intermittently-rotating charger-plate furnished with a series of chargers, and a stationary bottom plate above which said charger-plate rotates, of a compressing-plunger above the charger-plate and operating to compress the charges in each of said chargers in turn, a movable bunch-rolling table, an apron and a bunching-roller, and a discharging-plunger above the charger-plate operating to force the compressed charge out of each charger in turn, and means for operating the movable bunch-rolling table, substantially as specified.

9. The combination with a bottomless movable charger, a bottom plate over which said charger is moved, furnished with a notch or recess to permit the discharge of the charge from the charger, a compressing-plunger operating to compress the charge in said charger, and a discharging-plunger above the notch or recess in said bottom plate, and an up-and-down movable bunch-rolling table provided with an apron and a bunching-roller below the discharging-plunger to receive the compressed charge as it is forced out of the charger, and means for operating said movable bunch-rolling table, substantially as specified.

10. The combination with a bottomless movable charger, a bottom plate over which said charger is moved, furnished with a notch or recess to permit the discharge of the charge from the charger, a compressing-plunger, a discharging-plunger and an up-and-down movable table below said discharging-plunger provided with an apron and a bunching-roller, said table being curved, and said bunching-roller being operated by a lever pivoted concentrically with the curvature of the table, and said operating-lever and means for moving said bunch-rolling table up and down, said compressing-plunger being in advance of the discharging-plunger and operating to compress a charge in one of said chargers as the discharging-plunger forces the charge out of another charger substantially as specified.

11. In a cigar-bunch machine, the combination with a series of intermittently-movable bottomless chargers, a bottom plate upon which they move furnished with an opening, a compressing-plunger, a movable bottom for the charger, a reciprocating knife and a reciprocating opposing knife-block, substantially as specified.

12. In a bunching-machine, the combination with an intermittently-rotating charger plate or wheel B, furnished with a series of chargers, of a stationary notched bottom plate therefor, a compressing-plunger, a movable bottom for the chargers, a knife, a reciprocating slide or block to which the knife is secured, a ratchet secured to the rotating charger plate or wheel, and a pawl and pawl-arm connected to and operated by the knife-slide, substantially as specified.

13. In a bunching-machine, the combination with an intermittently-rotating charger plate or wheel B, furnished with a series of chargers, with a stationary notched bottom plate therefor, a compressing-plunger, a movable bottom for the chargers, a knife, a reciprocating slide or block to which the knife is secured, a ratchet secured to the rotating charger plate or wheel, a pawl and pawl-arm connected to and operated by the knife-slide, and a locking-lever for the charger plate or wheel operated by the knife-slide, substantially as specified.

14. In a bunching-machine, the combination with an intermittently-rotating charger plate or wheel B, furnished with a series of chargers, with a stationary notched bottom plate therefor, a compressing-plunger, a movable bottom for the chargers, a knife, a reciprocating slide or block to which the knife is secured, a ratchet secured to the rotating charger plate or wheel, a pawl and pawl-arm connected to and operated by the knife-slide, and a pair of locking-levers engaging ribs or projections on the charger plate or wheel and operated by the knife-slide, substantially as specified.

15. In a bunching-machine, the combination with an intermittently-rotating charger-plate furnished with a series of chargers and a compressing-plunger, of a discharging-plunger, an up-and-down-movable table, an apron and bunching-roller, said discharging-plunger following the downward movement of the table to compress or hold the charge in position while the bunching-roller is beginning its movement around the same, said compressing-plunger coöperating with one of said chargers to compress the charge therein while the discharging-plunger coöperates with another charger to force the charge out of the same, substantially as specified.

16. In a bunching-machine, the combination with an intermittently-rotating charger-plate furnished with a series of chargers and a compressing-plunger, of a discharging-plunger, an up-and-down-movable table, an apron and bunching-roller, said table being curved and a lever pivoted to said table-support and operating to swing or move the bunching-roller over the curved surface of the table, said compressing-plunger coöperating with one of said chargers to compress the charge therein while the discharging-plunger coöperates with another charger to force the charge out of the same, substantially as specified.

17. In a bunching-machine, the combination with an intermittently-rotating charger-plate furnished with a series of chargers and a compressing-plunger, of a discharging-plunger, an up-and-down-movable table, an apron and bunching-roller, and a lever and cam for moving said table up and down, said compressing-plunger coöperating with one of said chargers to compress the charge therein while the discharging-plunger coöperates with another charger to force the charge out of the same, substantially as specified.

18. In a bunching-machine, the combination with an intermittently-rotating charger-plate furnished with a series of chargers and a compressing-plunger, of a discharging-plunger, an up-and-down-movable table, an apron and bunching-roller, and a lever and cam for moving said table up and down, a lever upon which the bunching-roller is carried, and a lever and cam for operating said bunching-roller lever, said compressing-plunger coöperating with one of said chargers to compress the charge therein while the discharging-plunger coöperates with another charger to force the charge out of the same, substantially as specified.

19. In a bunching-machine, the combination with an intermittently-rotating charger plate or wheel furnished with a series of chargers, and a movable bottom coöperating in turn with each of the chargers, and a reciprocating knife between the charger and removable bottom, substantially as specified.

20. In a bunching-machine, the combination with a charger-plate having a charger open at top and bottom, of a reciprocating knife reciprocating across the charger and below the same, a double-stroke compressing-plunger and mechanism against which the tobacco in the charger is compressed by said compression-plunger, substantially as specified.

21. In a bunching-machine, the combination with an intermittently-rotating wheel furnished with a series of chargers, and a movable bottom coöperating in turn with each of the chargers, and a double-stroke compressing-plunger, and a reciprocating knife between the chargers and removable bottom, substantially as specified.

22. In a bunching-machine, the combination with an intermittently-rotating wheel furnished with a series of chargers, and a movable bottom coöperating in turn with each of the chargers, and a double-stroke compressing-plunger, and a reciprocating knife between said chargers and movable bottom, substantially as specified.

23. In a bunching-machine, the combination with an intermittently-rotating wheel furnished with a series of chargers, and a movable bottom coöperating in turn with each of the chargers, a double-stroke compressing-plunger, and a reciprocating knife between said chargers and movable bottom and an opposing movable knife-block, substantially as specified.

24. In a bunching-machine, the combination with a bottomless charger, of a compressing-plunger, a movable or yielding bottom for the charger, a knife and an opposing knife-block, the knife reciprocating between the charger and its movable bottom, and means for reciprocating said knife substantially as specified.

25. In a bunching-machine, the combination with an intermittently-rotating charger-plate furnished with a series of chargers, of a discharging-plunger, an up-and-down-movable table, an apron and bunching-roller, said table being curved and a lever pivoted to said table-support and operating to swing or move the bunching-roller over the curved surface of the table, said bunching-roller being mounted upon or carried by swinging arms pivoted to said operating-lever to enable the roller to pass over the bunch and onto the table and said swinging arms, substantially as specified.

26. In a bunching-machine, the combination with an intermittently-rotating charger-plate furnished with a series of chargers, of a discharging-plunger, an up-and-down-movable table, an apron and bunching-roller, and a lever and cam for moving said table up and down, a lever upon which the bunching-roller is carried, and a lever and cam for operating said bunching-roller lever, and swinging arms pivoted to said bunching-roller lever and upon which the bunching-roller is mounted, substantially as specified.

HERBERT JERSTRUM.

Witnesses:
H. M. MUNDAY,
S. E. CURTIS.